United States Patent
Engineer

(10) Patent No.: US 8,492,914 B2
(45) Date of Patent: Jul. 23, 2013

(54) CRANK-WEB MOUNTED LINEARLY SEGMENTED STARTER GENERATOR SYSTEM

(75) Inventor: Nayan Engineer, Canton, MI (US)

(73) Assignees: Hyundai Motor Company, Seoul (KR); Kia Motors Corporation, Seoul (KR); Hyundai America Technical Center, Inc., Superior Township, MI (US)

( * ) Notice: Subject to any disclaimer, the term of this patent is extended or adjusted under 35 U.S.C. 154(b) by 397 days.

(21) Appl. No.: 12/851,404

(22) Filed: Aug. 5, 2010

(65) Prior Publication Data

US 2012/0032441 A1 Feb. 9, 2012

(51) Int. Cl.
*H02K 23/52* (2006.01)

(52) U.S. Cl.
USPC ............................................................ 290/31

(58) Field of Classification Search
USPC ...................................... 290/31–35; 310/90.5
See application file for complete search history.

(56) References Cited

U.S. PATENT DOCUMENTS

| | | | | |
|---|---|---|---|---|
| 1,350,424 A * | 8/1920 | Schurch | ........................ | 290/12 |
| 2,590,199 A * | 3/1952 | Muzzey | ........................ | 416/45 |
| 2,654,849 A * | 10/1953 | Trofimov | ........................ | 310/99 |
| 3,465,739 A * | 9/1969 | Burson | ........................ | 123/149 R |
| 3,502,920 A * | 3/1970 | Chaboseau | ........................ | 310/90 |
| 4,418,677 A * | 12/1983 | Hofmann | ........................ | 123/599 |
| 2003/0178909 A1 * | 9/2003 | Kusase et al. | ........................ | 310/254 |

* cited by examiner

*Primary Examiner* — Jean F Duverne
(74) *Attorney, Agent, or Firm* — Edwards Wildman Palmer LLP; Peter F. Corless

(57) ABSTRACT

Featured is a starter/generator to start a reciprocating engine or generate electrical energy using the engine. The starter/generator includes a plurality of magnetic elements that establish a magnetic flux, each magnetic element being attached to a surface of the crankshaft so the element moves in a prescribed path as the crankshaft rotates; a plurality of stator elements being arranged within the engine so as to be maintained in fixed relation to a corresponding magnetic element as it moves in the prescribed path, and control circuitry being configured and arranged to control the functionality of each stator element. In one mode a stator element is controlled so that movement of the magnetic element by the stator element cause electrical energy to be generated in the respective stator element and so in another mode each stator element/magnetic element combination operates the motor/generator as a motor.

9 Claims, 13 Drawing Sheets

CRANK-WEB MOUNTED LINEARLY SEGMENTED STARTER GENERATOR SYSTEM

FIELD OF INVENTION

The present invention relates to motors associated with the starting or a reciprocating engine such as an internal combustion engine and generators that generating power from the motion of the reciprocating engine; more particularly the present invention relates to integrated starter motor generators for internal combustion engines and yet more particularly to a starter/motor/generator that is crank-mounted.

BACKGROUND OF THE INVENTION

Internal combustion engines are not self-starting and thus assistance is provided so that the engine can start and thereafter continue to operate. As a number of internal combustion engines require energy to be provided to continue to operate (e.g., generation of an ignition spark) as well as to run other auxiliary devices (e.g., lights, computer, radios, clock, navigation system, etc.), devices (e.g., generators, alternators) are provided with the engine to generate such energy. As shown in FIG. 1A, the starter/generator system for a number of years was a separate starter motor to start the engine and an alternator/generator that generated electrical energy to run electrically powered devices and charge the battery.

The starter motor was mechanically coupled to the flywheel by gearing. Thus, when the engine was to be started (e.g., by turning the ignition key to "start") the battery was coupled to the starter motor. The rotation of the starter motor caused the flywheel which in turn caused the crankshaft to rotate thereby creating conditions within the engine to start the combustion process. In the starting process, the clutch also was operated so as to decouple the flywheel from the gear box so that the rotational energy being provided by the starter motor was not delivered to portions of the powertrain downstream of the gear box.

The alternator was operably coupled to the crankshaft by a circuitous belt. When the engine was running the rotational motion of the crankshaft caused the belt to run in a circuitous path. This continuous circuitous movement of the belt in turn caused the alternator to operate and to generate electrical energy. Typically, rectification circuitry and regulation circuitry was provided, so that the alternator output was a DC voltage and so the voltage output was in a desired DC voltage range.

In recent years efforts have been undertaken to integrate the starter-generator (ISG), such as shown for example in FIG. 1B. In this system, a single device is provided for both the starter motor and generator—a starter/alternator. This starter/alternator is mechanically coupled to the crankshaft using a circuitous belt much like that described above in connection with FIG. 1A.

When the engine is to be started, the starter/alternator is configured and operated so as to function as a motor. In other words, the battery is electrically coupled to the starter/alternator so it rotates as a motor. Such rotation in turn is imparted to the crankshaft via the movement of the belt, thus creating conditions contusive to engine starting. The clutch also is operated so as to decouple the flywheel from the gear box as is described above. After the engine is started, the starter/alternator is re-configured so that it is thereafter operated as the alternator. Because of concerns of belt stretching and slippage over time, such a system can be less effective or reliable for starting as compared to systems in which the starter motor is mechanically coupled to the flywheel.

Referring now to FIG. 1C there is shown another ISG, where the starter/alternator is mechanically coupled to the flywheel and thus the engine's crankshaft via a clutch. As described above, another clutch is provided between the starter/alternator and the gearbox in order to isolate other portions of the power train (e.g., gearbox, wheels, etc.) from the starter/alternator.

When the engine is to be started, the starter/alternator is configured and operated so as to function as a motor. In other words, the battery is electrically coupled to the starter/alternator so as to cause it and the flywheel to rotate. Such rotation of the flywheel causes the crankshaft to rotate, thereby creating conditions conducive to engine starting. After the engine is started, the starter/alternator is again configured so that it is thereafter operated as the alternator. Such an ISG also can be configured so as to create a hybrid engine so that the starter/generator can be used to provide additional power to the power train.

As the starter/alternator and additional clutch are provided between the flywheel and gearbox, this in effect increases the length of the engine. Such an increase in length affects layout and design of the automobile so that the increased length can be accommodated. Such concerns are of particular importance for cars which are front wheel driven because the engines are usually transverse mounted.

There is found in US Pub. No. 2009/0091137 a generator equipped engine in which the generator is external to the engine and coupled or mounted to the crankcase of the engine. The generator includes a flywheel that functions as the motor rotor and a stator that is in fixed relation to the crankcase. The generator flywheel is operably coupled to the crankshaft so that movement of the crankshaft causes the generator flywheel to rotate.

There is found in US Pub. No. 2004/0084978 a magento-generator and a method for manufacturing same. Such a magneto-generator includes a bowl-shaped flywheel, a plurality of magnets mounted on an inner peripheral surface of the flywheel, a resin filled around each of the individual magnets for fixedly securing the magnets to the flywheel as integral parts thereof, and a generator coil disposed within the bowl-shaped flywheel in opposition to the magnets for generating electric power under the action of electromagnetic induction brought about through cooperation with the magnets. In use, a hub or boss of the flywheel that is centrally located is operably coupled to a rotor or rotatable shaft (e.g., crank shaft of an internal combustion engine). In this way, rotation of the rotor/shaft causes the flywheel to rotate thereby generating electrical power. much as is done with a conventional motor generator set.

It thus would be desirable to provide a new starter/motor/generator for a reciprocating engine such as an internal combustion engine and methods related thereto. It would be particularly desirable to provide such a starter/motor/generator that is crank-web mounted and is linearly segmented. It also would be desirable to provide such a starter/motor/generator that is capable of providing torque fill while the reciprocating engine is concurrently running.

SUMMARY OF THE INVENTION

The present invention generally features a starter/generator or device to start a reciprocating engine and/or generate electrical energy using the engine. The starter/generator includes a plurality of magnetic elements that establish a magnetic flux, each magnetic element being attached to a surface of the crankshaft so the element moves in a prescribed path as the crankshaft rotates; a plurality of stator elements being arranged within the engine so as to be maintained in fixed relation to a corresponding magnetic element as it moves in the prescribed path, and control circuitry being configured and arranged to control the functionality of each stator element. In one mode, the stator element is controlled so that movement of the magnetic element by the stator element cause electrical energy to be generated in the respective stator element and so that in another mode each stator element/ magnetic element combination operates the motor/generator as a motor. As described further herein in other aspects of the present invention there are featured a reciprocating engine embodying such a starter motor and methods related thereto.

More particularly, there is featured a starter/generator for a reciprocating engine to start the reciprocating engine and/or to generate electrical energy using the engine. Such a starter/ generator includes a plurality of magnetic elements that establish a magnetic flux field. Each of the plurality of magnetic elements is attached to a surface of a crankshaft for a reciprocating engine so as to move in a prescribed path responsive to rotation of the crankshaft. More particularly, the surface of the crankshaft is a surface of a counterweight of the crankshaft.

Also included is a plurality of stator elements that are arranged and configured within the reciprocating engine so as to be maintained in fixed relation to a corresponding magnetic element as the magnetic element moves in the prescribed path. Such a starter/generator also includes control circuitry that is configured and arranged to control the functionality of each stator element, such that in one mode a corresponding stator element is controlled so that movement of the corresponding magnetic element by the corresponding stator element cause electrical energy to be generated in the respective stator element and such that in another mode each stator element/magnetic element combination operates the starter/ generator as a motor.

In further embodiments, the plurality of magnetic elements are secured to structure of the crankshaft so that the magnetic elements are rotated in the prescribed path responsive to rotation of the crankshaft. In further embodiments, the plurality of magnetic elements are secured to structure of the crankshaft so that the magnetic elements are rotated in the prescribed path responsive to rotation of the crankshaft. In yet further embodiments, the magnetic elements are permanent magnets.

In yet further embodiments, each of the plurality of stator elements are arranged within the engine so that the corresponding magnetic element rotates past a surface of the corresponding stator element. In further embodiments, each stator element includes a plurality of iron cores and a plurality of wire coils or wire windings, each coil or winding being wrapped around a respective iron core, and wherein the controlling circuitry is operably coupled to each wire coil.

In yet further embodiments, each stator element includes a cooling mechanism for drawing heat energy from the stator element. More particularly, the cooling mechanism is a channel or gallery that is thermally coupled to the iron cores and a cooling medium that flows through the channel.

According to another aspect of the present invention there is featured a reciprocating engine including a crankshaft having a structure that rotates in a prescribe path about a centerline of the crankshaft and a starter/generator that is operably coupled to the crankshaft such that in one operational mode the starter/generator cause the crankshaft to rotate and in a second operational mode the rotation of the crankshaft causes the starter/generator to output electrical energy. Such a starter/generator includes a plurality of magnetic elements, a plurality of stator elements, and control circuitry.

Each of the plurality of magnetic elements establish a magnetic flux field. Each of the plurality of magnetic elements is attached to a surface of the crankshaft structure so as to move in the prescribed path responsive to rotation of the crankshaft. The plurality of stator elements are arranged and configured within the reciprocating engine so as to be maintained in fixed relation to a corresponding magnetic element as the magnetic element moves in the prescribed path. The control circuitry is configured and arranged to control the functionality of each stator element, such that in one operational mode each stator element/magnetic element combination operates so the starter/generator operates as a motor to rotate the crankshaft and so that in the second operational mode a corresponding stator element is controlled so that movement of the corresponding magnetic element by the corresponding stator element cause electrical energy to be generated by the starter/generator.

In further embodiments, the plurality of magnetic elements are permanent magnets and the structure of the crankshaft to which the magnetic element is secured to is the crankshaft counterweight structure. In more specific embodiments, a magnetic element is secured to each crankshaft counterweight using any of a number of techniques known to those skilled in the art and appropriate for the intended use. In further embodiments, the permanent magnets are rare earth magnets that are made from alloys of rare earth elements.

In yet further embodiments, each of the plurality of stator elements are fixedly arranged within the reciprocating engine so that the corresponding magnetic element rotates past a surface of the corresponding stator element. In more particular embodiments, each stator element includes a plurality of iron cores and a plurality of wire coils, each coil being wrapped around a respective iron core, and wherein the controlling circuitry is operably coupled to each wire coil. In yet more particular embodiments, there is one stator element for each corresponding magnetic element and even more particularly, there is two stator elements or a pair of stator elements for each corresponding magnetic element.

In an exemplary embodiment, in which the reciprocating engine is a four cylinder engine having eight crankshaft counterweights, there are eight counterweights. Thus, the starter/ generator would include eight magnetic elements, each being secured to a counterweight and eight stator elements, one pair of stator elements for a pair of counterweight/magnetic elements. In more specific embodiments, the control circuitry is configured so that each pair of stator elements and corresponding magnetic elements is separately controlled.

In yet further embodiments, each stator element includes a cooling mechanism for drawing heat energy from the stator element. More particularly, the cooling mechanism is a channel thermally coupled to each iron core and a cooling medium that flows through the channel.

According to another aspect of the present invention there are feature methods for controlling starting of a reciprocating engine and/or generating electrical power using the reciprocating engine.

In one embodiment, there is featured a method for controlling the starting of a reciprocating engine having a crankshaft including structure that rotates in a prescribe path about a centerline of the crankshaft. Such a method includes providing a starter/generator that is operably coupled to the crankshaft, wherein the starter/generator includes a plurality of magnetic elements that establish a magnetic flux field, each of the plurality of magnetic elements being attached to a surface of a crankshaft structure so as to move in a prescribed path responsive to rotation of the crankshaft and a plurality of stator elements being arranged and configured within the reciprocating engine so as to be maintained in fixed relation to a corresponding magnetic element as the magnetic element moves in the prescribed path. Such a method further includes controlling the functionality of each stator element, so that each stator element/magnetic element combination operates so said motor/generator operates as a starter motor to rotate the crankshaft so as to thereby to establish engine starting conditions within the reciprocating engine.

In another embodiment there is featured a method for generating electrical power from a reciprocating engine having a crankshaft including structure that rotates in a prescribe path about a centerline of the crankshaft. Such a method includes providing a starter/generator that is operably coupled to the crankshaft, wherein the starter/generator includes a plurality of magnetic elements that establish a magnetic flux field, each of the plurality of magnetic elements being attached to a surface of a crankshaft structure so as to move in a prescribed path responsive to rotation of the crankshaft and a plurality of stator elements being arranged and configured within the reciprocating engine so as to be maintained in fixed relation to a corresponding magnetic element as the magnetic element moves in the prescribed path. Such a method also includes controlling the functionality of each stator element, so that movement of the corresponding magnetic element by the corresponding stator element cause electrical energy to be generated in the respective stator element or starter/generator.

In yet another embodiment there is featured a method for one of controlling starting of a reciprocating engine or generating electrical power using the reciprocating engine, the reciprocating engine having a crankshaft including structure that rotates in a prescribe path about a centerline of the crankshaft. Such a method includes providing a starter/generator that is operably coupled to the crankshaft, wherein the starter/generator includes a plurality of magnetic elements that establish a magnetic flux field, each of the plurality of magnetic elements being attached to a surface of a crankshaft structure so as to move in a prescribed path responsive to rotation of the crankshaft and a plurality of stator elements being arranged and configured within the reciprocating engine so as to be maintained in fixed relation to a corresponding magnetic element as the magnetic element moves in the prescribed path. Such a method also includes controlling the functionality of each stator element such that in one operational mode the starter/generator causes the crankshaft to rotate to start the engine and in a second operational mode the rotation of the crankshaft causes the starter/generator to output electrical energy.

In further embodiments, in said one operational mode, said controlling includes controlling the functionality of each stator element, so that each stator element/magnetic element combination operates so said motor/generator operates as a starter motor to rotate the crankshaft so as to thereby to establish engine starting conditions within the reciprocating engine. Also; in said second operational mode, said controlling includes controlling the functionality of each stator element, so that a corresponding stator element is controlled so that movement of the corresponding magnetic element by the corresponding stator element cause electrical energy to be generated in the respective stator element.

Other aspects and embodiments of the invention are discussed below.

DEFINITIONS

The instant invention is most clearly understood with reference to the following definitions:

As used in the specification and claims, the singular form "a", "an" and "the" include plural references unless the context clearly dictates otherwise.

As used herein, the term "comprising" or "including" is intended to mean that the compositions, methods, devices, apparatuses and systems include the recited elements, but do not exclude other elements. "Consisting essentially of", when used to define compositions, devices, apparatuses, systems, and methods, shall mean excluding other elements of any essential significance to the combination. Embodiments defined by each of these transition terms are within the scope of this invention.

USP shall be understood to mean U.S. Patent Number, namely a U.S. patent granted by the U.S. Patent and Trademark Office.

US Pub. No. shall be understood to mean U.S. Patent Application Publication Number, namely the US patent application as published by the U.S. Patent and Trademark Office.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 2:
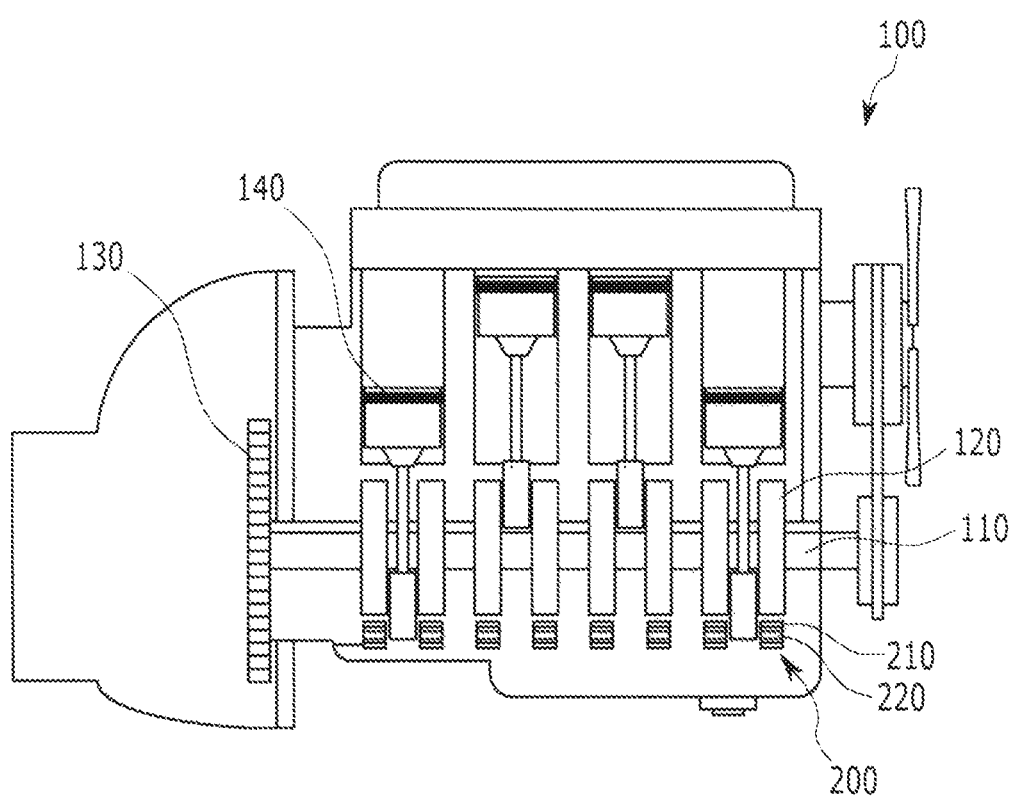
FIG. 2 is an illustrative view of a reciprocating engine having a starter/generator system of the present invention.

Referring now to the various figures of the drawing wherein like reference characters refer to like parts, there is shown in FIG. 2 an illustrative view of a reciprocating engine 100 of the present invention including a starter/generator system 200 also of the present invention. Such a reciprocating engine also includes a crankshaft 110, pistons 140 that are movable received in the cylinders of the cylinder block, and a flywheel 130 that is operably coupled to the crankshaft so that the power (horsepower, torque) generated by the engine is provided to the powertrain (e.g., wheels, gearbox, etc of a automobile/truck).

The starter/generator 200 of the present invention embodies concepts of a brushless DC machine, where the pole magnets are mounted (e.g., surface mounted) on the rotor. The starter/generator 200 of the present invention splits the rotor and stator feature of such a DC machine into segments and linearly displaces the segments along a common axis, the long axis of a crankshaft. More particularly, the crankshaft of an engine is adapted to also function as the rotor of such a DC machine by mounting or securing magnetic elements or permanent magnets to the crankshaft and positioning a stator element in proximity to the path taken by the magnetic elements or permanent magnets as the crankshaft rotates. Current reversals between the segments are achievable using any of a number of techniques known to those skilled in that art, including sensing rotor position, back EMF induced by the magnet passing over the coils of the stator or by continuous coil switching.

As further described in detail hereinafter, such a starter/generator system 200 includes a plurality of magnetic elements 210, such as permanent magnets, one for each specific structural feature of the crankshaft (e.g., counterweight) that they are to be are secured to and a plurality of stator elements, one stator element for each magnetic element. In more particular embodiments, two stator elements and two magnetic elements form a pole rotor/stator assembly that are operated together.

The stator elements 220 are preferably mounted within the engine so that they are maintained in fixed relation to the moving magnetic elements. In particular exemplary embodiments, the structure of a conventional ladder frame or bedplate that is attached to the cylinder block, is adapted so as to support each of the stator elements 220. For example, a conventional ladder frame is adapted to include additional webs or cross members to which the stator elements 220 are secured.

Figure 1A:
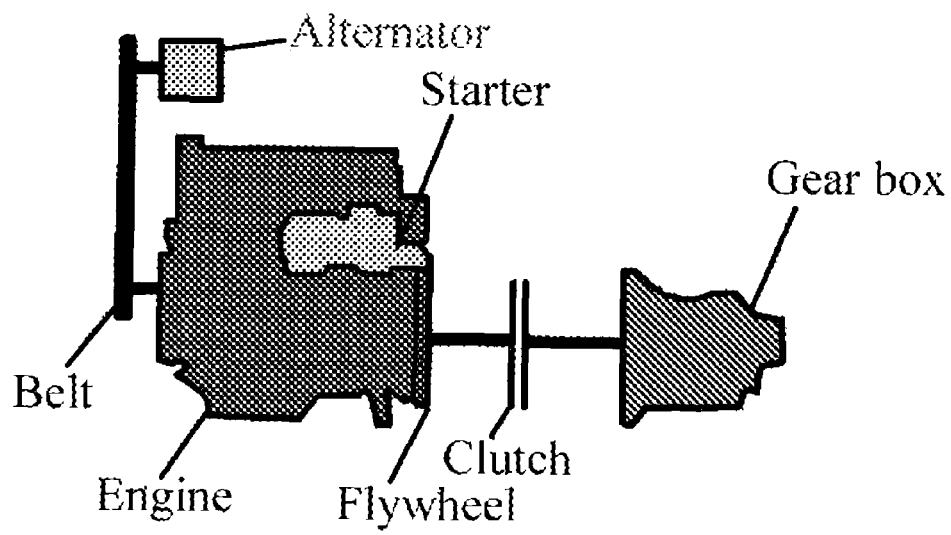
FIGS. 1A-C are illustrative views showing various conventional starter/generator systems.
Figure 1B:
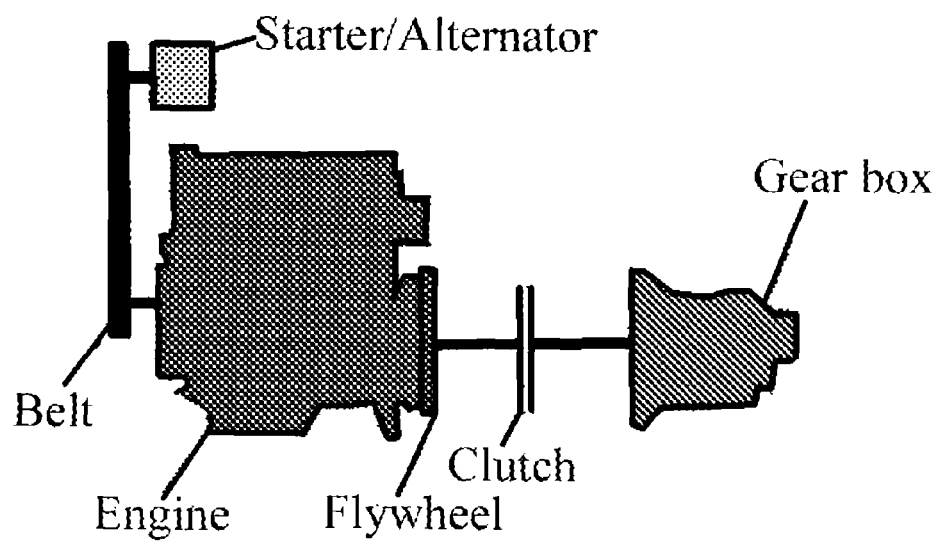
Figure 1C:
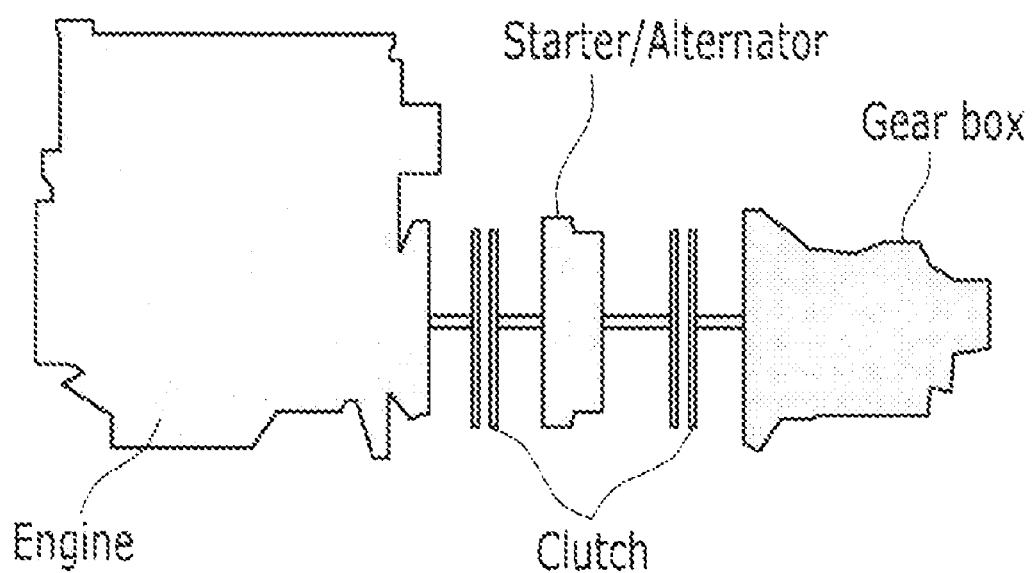

Such a starter/generator system 200 when embodied in the reciprocating engine 100 has a number of advantageous effects as compared to conventional starter/generator systems. As the starter/generator system 200 of the present invention is integrated within the reciprocating engine, there is no change to the engine length, which occurs with the engine arrangement shown in FIG. 1C. Because of such integration, structural elements required for operation of the alternator of FIG. 1A or the starter/alternator of FIG. 1B can be eliminated thereby reducing vehicle weight. The system also is adaptable so as to provide a start/stop capability with optimal control of the engine stop position for restart, which can result in fuel savings. As the control circuitry yields a brushless design, maintenance requirements is expected to be reduced. In addition, as the starter/generator is integrated with crankshaft operation, the motor feature of the starter/generator also can be utilized to provide additional power to the crankshaft during operation so as to provide a torque fill at low rpm, thereby improving engine performance.

Figure 3:
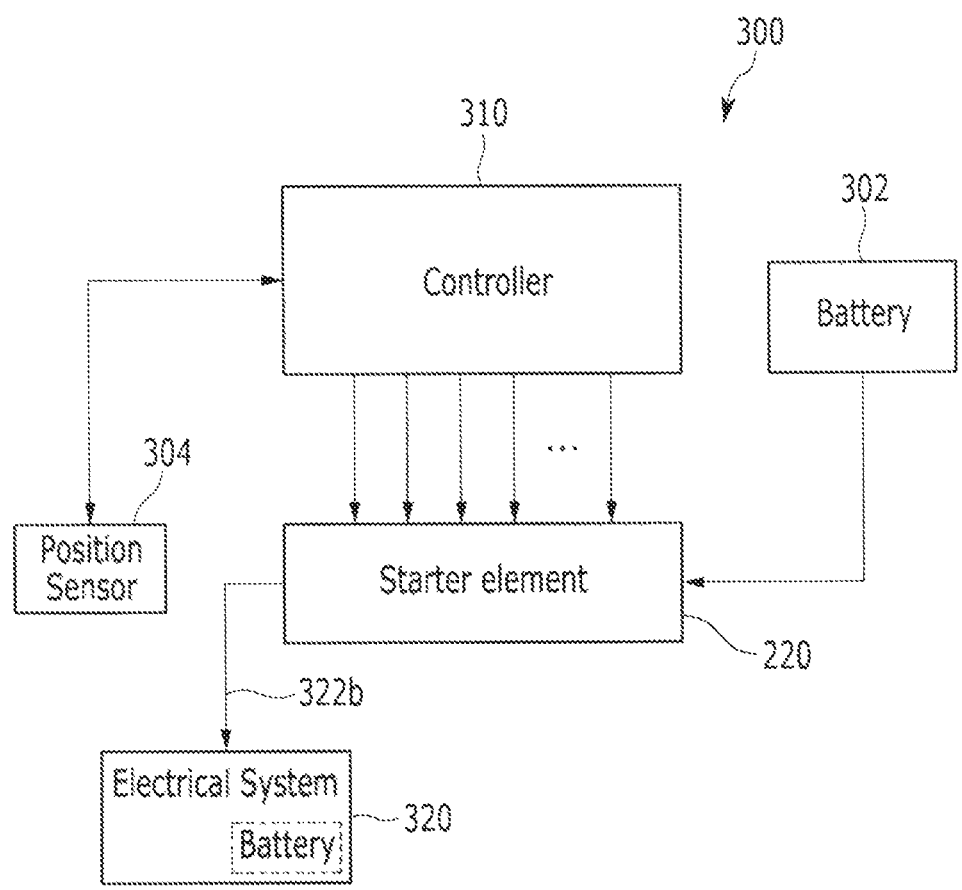
FIG. 3 is a schematic block diagram of a control system that controls the functionalities of the starter/generator of the present invention.

Referring now to FIG. 3 there is shown a schematic block diagram of the control system 300 that controls various functionalities of the starter/generator 200 of the present invention. Reference shall be made to FIG. 2 and the figures that follow as to features having common reference numbering.

Such a control system 300 includes a controller 310 that receives inputs, data and instructions and provides outputs to control the operation of the various functionalities of the starter/generator. In particular embodiments, the controller 300 embodies a microprocessor, a microcontroller, digital signal processor, or application specific integrated circuit (ASIC), that includes instructions and criteria and where appropriate code segments, that evaluate the inputs, data and instructions and to control the different operational modes of the starter/generator as well as operation of the starter/generator during a specific operational mode.

When the starter/generator 200 is to be operated as a starter motor, the controller 300 configures and controls all of the stator elements 220 for the reciprocating engine 100 in the appropriate manner such that the stator element(s) for each corresponding magnetic element cause the crankshaft to rotate about its centerline thereby causing the pistons 140 connected thereto to move up and down in the cylinders. More specifically, the stator elements are selectively connected to the battery 302 by the controller, so the stator elements are sequentially energized with current and voltage from the battery in the appropriate manner to cause rotation of the crankshaft.

It should be noted that an electronic sensing or drive unit or position sensor 304, such as a Hall effect device, is provided that can sense the position of the rotating magnets, the crankshaft counterweight, or other feature of the crankshaft, that can be used to identify the position of the rotating magnets for each counterweight. This position is used by the controller 300 to selectively switch current, such as by using a MOSFET transistor, to each stator element 220. Electronic switching is used in the present invention, because in preferred embodiments the starter/generator 200 is brushless.

As is known to those skilled in the art, when the crankshaft is being so rotated to start an internal combustion engine, an appropriate fuel-air mixture is introduced into the cylinders at the appropriate timing such that the fuel-air mixture can be ignited in the cylinders to initiate the combustion process and the continued self-operation of the engine.

Figure 12:
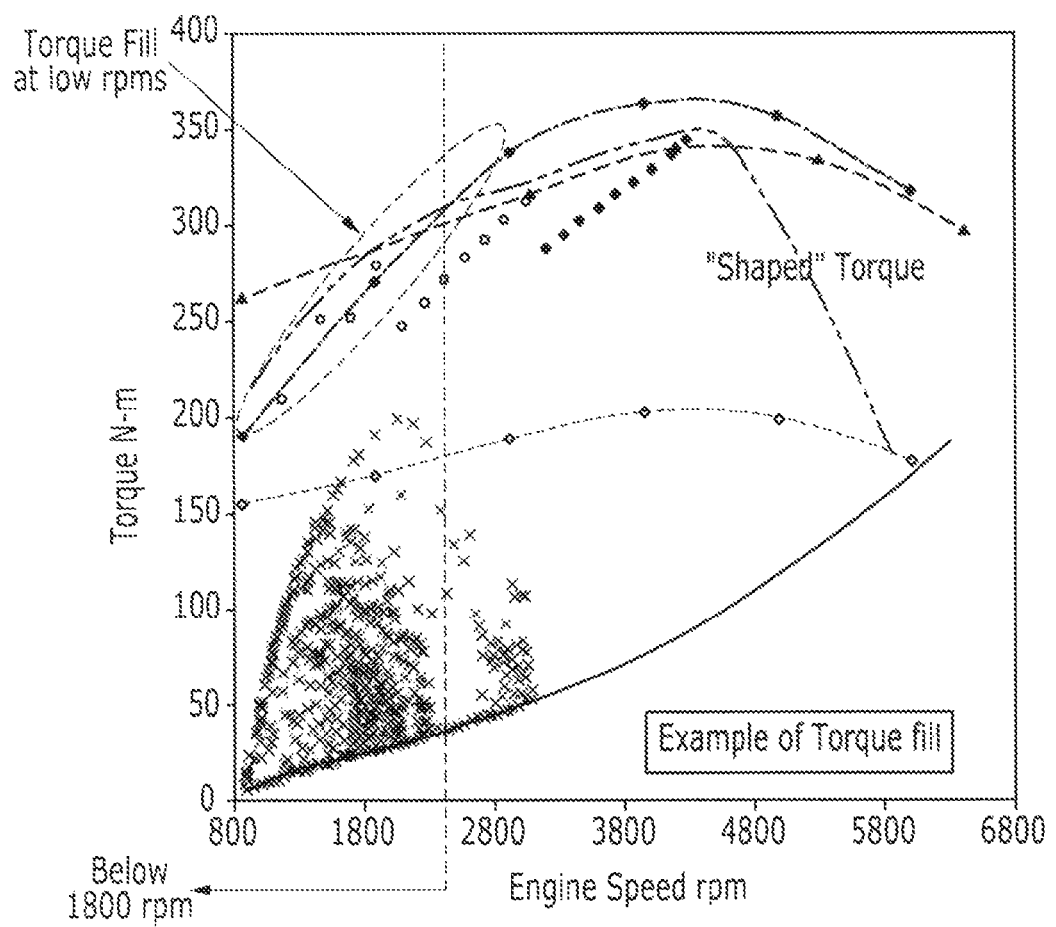
FIG. 12 is a graphical view illustrating torque filling at low rpms using the starter/generator of the present invention as a motor.

When the starter/generator 200 is to be operated as a motor for torque fill, the controller 300 configures and controls all of the stator elements 220 for the reciprocating engine 100 in the appropriate manner such that the stator element(s) for each corresponding magnetic element will provide additional power to the rotating crankshaft in addition to that being provided by the combustion process where the pistons 140 move up and down in the cylinders. More specifically, the stator elements are selectively connected to the battery 302 by the controller, so the stator elements are sequentially energized with current and voltage from the battery to provide the additional power to the crankshaft. The graphical view of torque versus engine speed as provided in FIG. 12 illustrates such a torque filling effect.

The controller 300 would cause such additional power to be generated when the predetermined conditions for taking such action are satisfied. The controller 300 also would terminate providing such additional power after other conditions are satisfied for taking such action.

When the starter/generator is to be operated as a generator, the controller configures and controls all of the stator elements 220 so that each magnetic element/stator element(s) produces electrical energy as the magnetic element passes by the stator element(s). The electrical energy being produced is output to the electrical system 320 including the battery (charging the battery). This operation of supplying electrical energy would continue until the engine is shutdown or other action taken requiring termination of electrical power production (e.g., reconfiguring starter/generator as a motor for torque fill).

Figure 4:
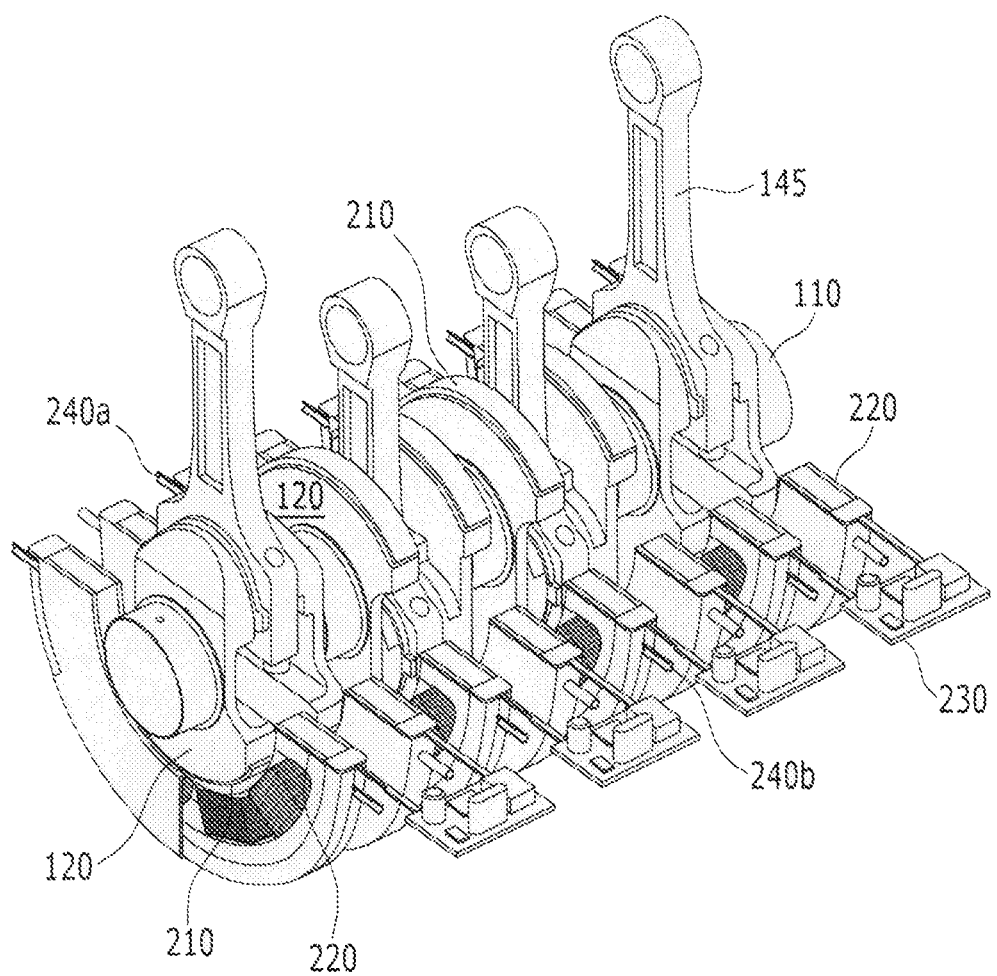
FIG. 4 is a perspective view of the crankshaft and connecting rods of an engine when configured with a starter/generator of the present invention.
Figure 6:
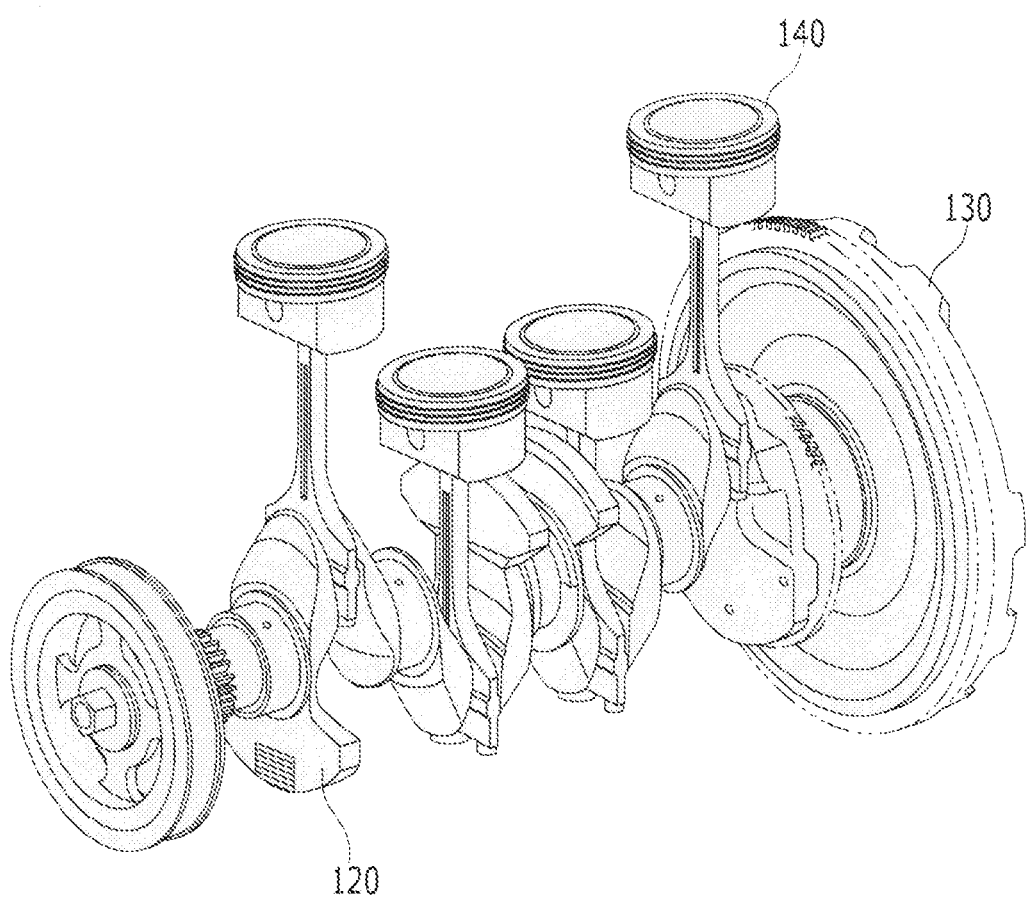
FIG. 6 is perspective view of another crankshaft and connecting rods of another engine having a different number of counterweights.

Referring now to FIG. 4 there is shown a perspective view of the crankshaft 110 and connecting rods 145 of an engine when configured with a starter/generator 200 of the present invention. The illustrated embodiment depicts a four cylinder internal combustion engine where the crankshaft 110 is configured so as to include eight counterweights 120. This illustrated embodiment is not limiting. For example, such a four cylinder engine can be configured with four counter weights as shown in FIG. 6. The number of counter weights is dependent upon a number of factors including the number of cylinders and the configuration (e.g., slanted, inline, V) of the engine.

Figure 5:
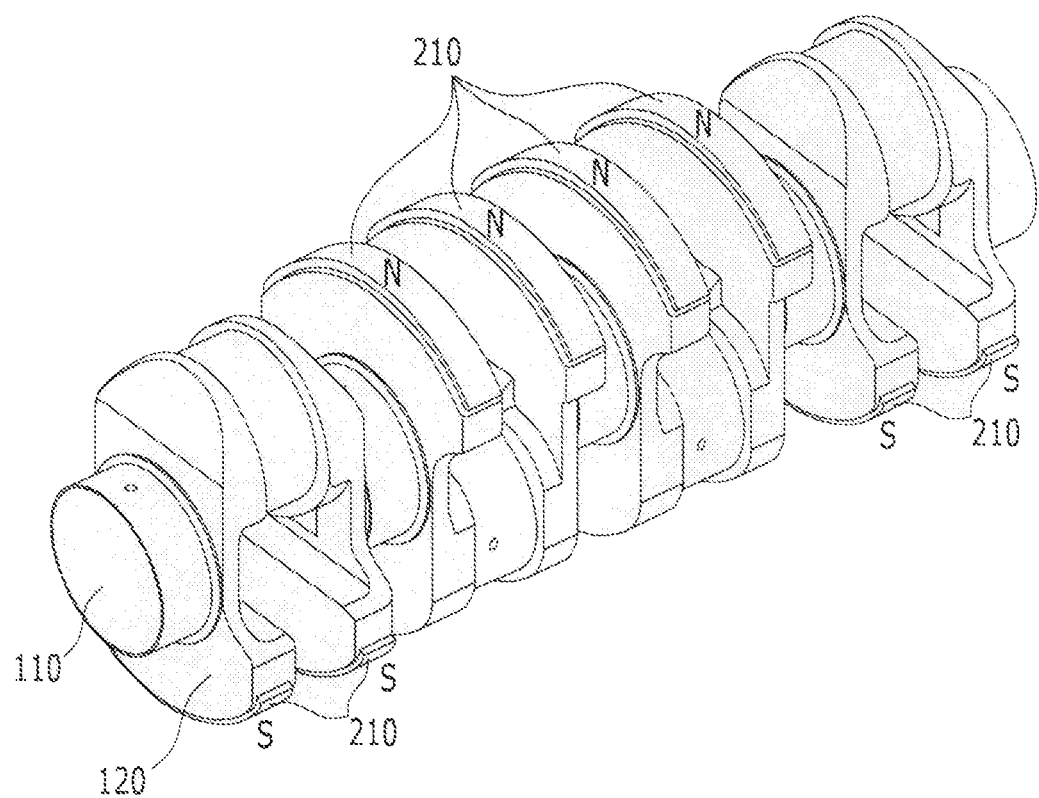
FIG. 5 is another perspective view crankshaft and connecting rods of an engine when configured with a starter/generator of the present invention but further illustrating an exemplary magnetic pole arrangement.

A magnetic element 210 or permanent magnet is attached so as to extend along an end surface of the counterweight. The permanent magnet can be uni-polar or bi-polar such that the same magnetic pole is being presented. In particular embodiments, and with reference also to FIG. 5, the permanent magnets are arranged so that the north and south poles are equally distributed amongst the eight counterweights. It should be recognized that the above-described number and distribution of magnetic poles is illustrative and is something that can be easily established by one skilled in the art based on the disclosures and teachings herein.

In more particular embodiments, the permanent magnets preferably are rare-earth magnets, which as permanent magnets from alloys of rare earth elements. In exemplary embodiments, the rare-earth magnets are neodymium magnets or samarium-cobalt magnets. Such rare-earth magnets also are usually plated or coated to protect the from breaking or chipping. These magnets can be secured to a surface or body using any of a number of techniques known to those skilled in the art, including by use of adhesives.

Figure 7:
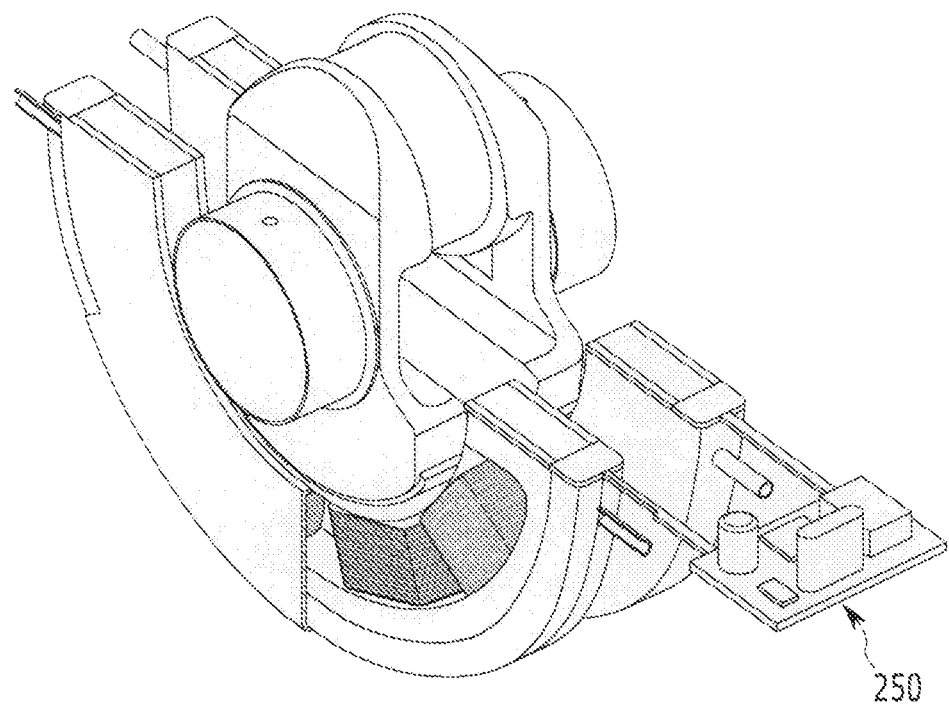
FIG. 7 is perspective view of a single pole of a combination of counterweights and stator elements (including partial cutaway) with a modular pole drive unit.
Figure 8:
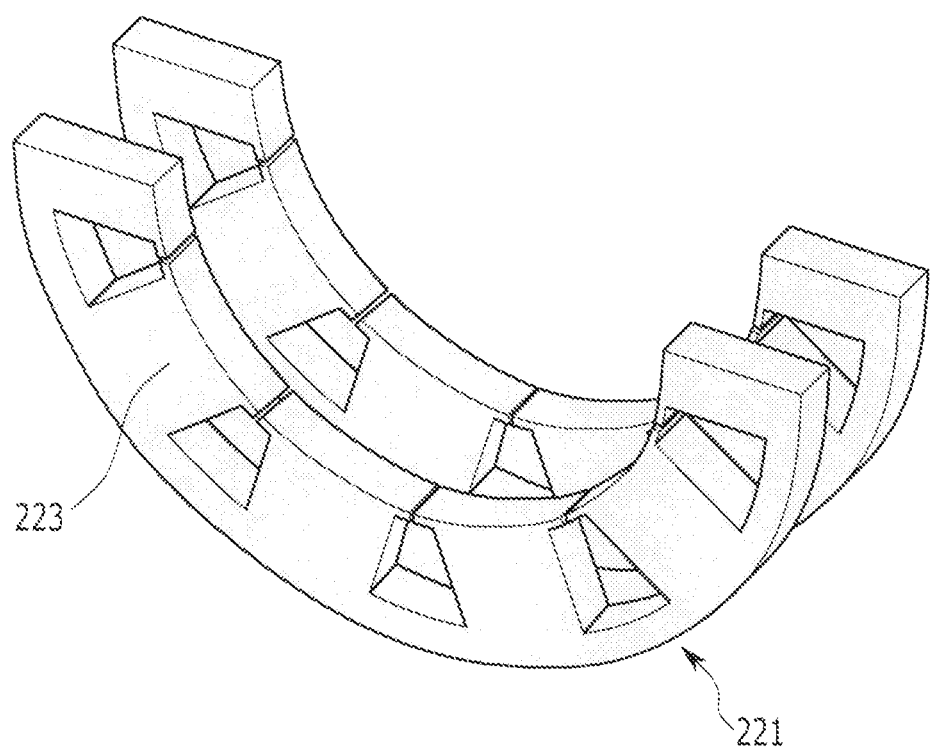
FIG. 8 is a perspective view of a stator for a stator element.
Figure 9:
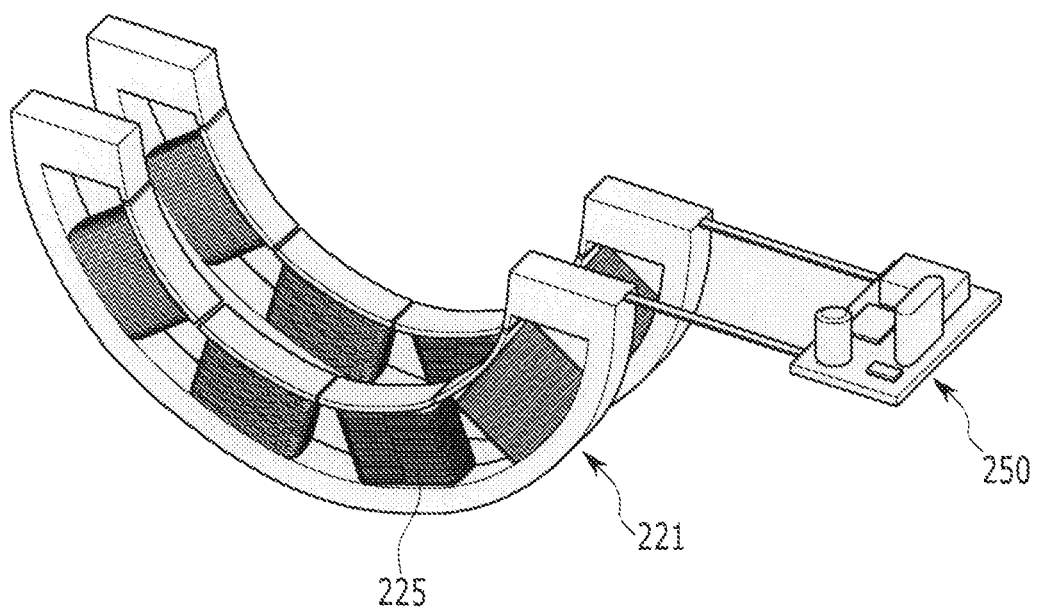
FIG. 9 is a perspective view of the stator of FIG. 8 with windings or coils added.
Figure 10:
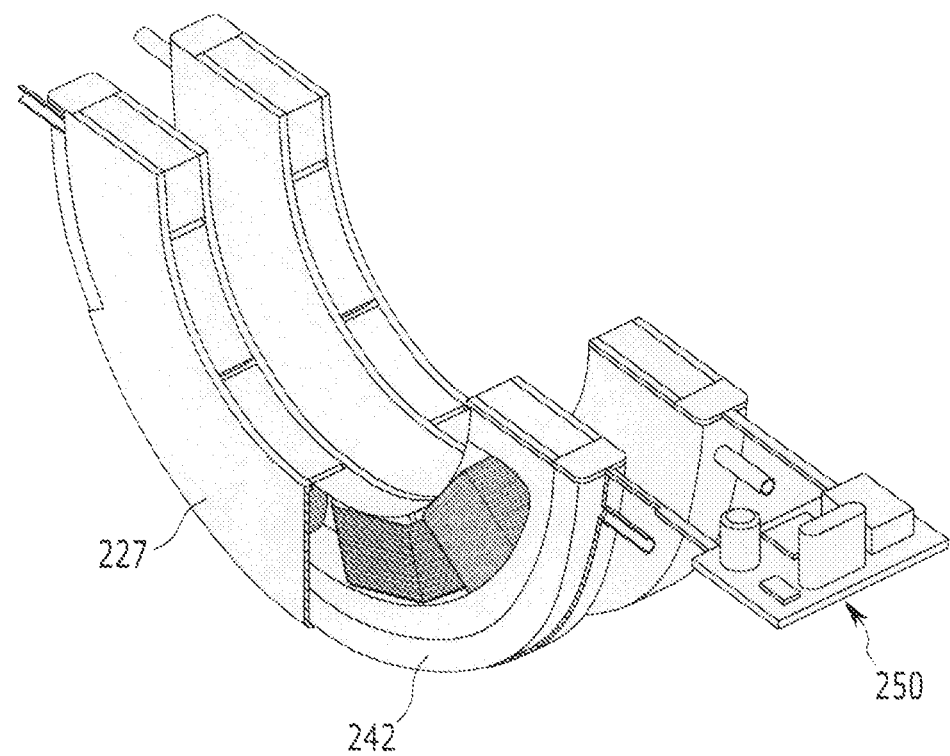
FIG. 10 is a perspective view of a stator element with a partial cutaway showing a cooling gallery.
Figure 11:
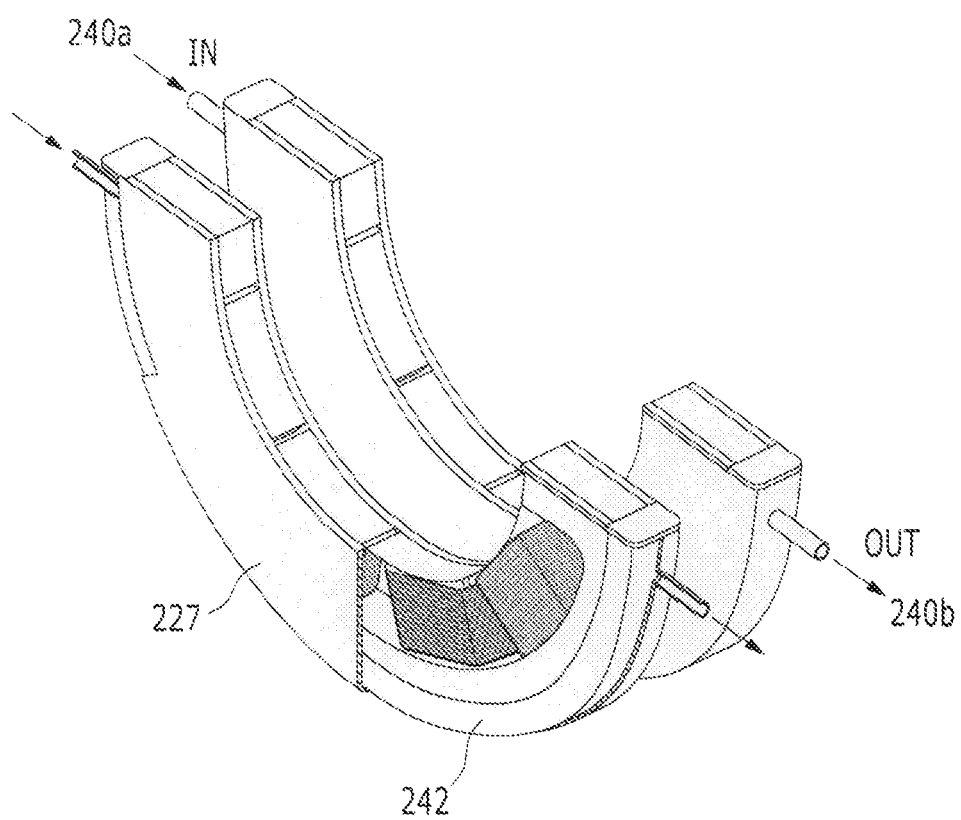
FIG. 11 is another perspective view of the stator element with a partial cutaway showing the cooling gallery and also the coolant inlet and outlet lines.

Referring now to FIGS. 7-11, there are shown a perspective view of a single pole of a combination of counterweights and stator elements (including partial cutaway) with a modular pole drive unit (FIG. 7); a perspective view of a stator for a stator element; FIG. 8) a perspective view of the stator of FIG. 8 with windings or coils added (FIG. 9); a perspective view of a stator element with a partial cutaway showing the cooling gallery (FIG. 10) and another perspective view of the stator element with a partial cutaway showing the cooling gallery and also the coolant inlet and outlet lines (FIG. 11).

In particular embodiments and as shown in FIG. 7, the magnetic elements on the counterweights and the stator elements are arranged so that two magnetic elements and two stator elements are arranged to form a single pole and the electrical output lines for the two stator elements are coupled to a modular pole driver unit 250. In an exemplary embodiment, the modular pole driver unit includes the power electronics and controller for controlling operation of the stator.

As shown in FIGS. 8 and 9, the stator 221 for each stator element 220 is a arcuate structure have two ring segments and radial portions 223 extending there between and spaced from each other. The stator 220 is formed of a material that is appropriate for the intended use. For example, the stator material is an iron material.

In more particular embodiments, wire (e.g., copper wire) is wound about each of the interior radial segments or iron cores of the stator 220 so as to from a wire winding or coil 225. In more particular embodiments, each stator 220 includes a plurality of iron cores and a plurality of wire coils or windings, each coil or winding being wrapped around a respective iron core. These wire windings or coils are arranged so as to form concentrated windings. Concentrated windings are advantageous as compared to distributed windings as concentrated windings provide a higher inductance for the same magnetic flux as compared to distributed windings as well as reducing the copper volume.

In further embodiments, the stator element further includes side elements 227 that are secured to the stator 221 in such as way that the interior volume of the stator is hermetically sealed or forms an enclosed volume. In this way, the stator elements 220 can be partially or totally submerged in the oil contained in the oil pan or crankcase of the engine.

As also depicted in FIGS. 10 and 11, each stator element 220 is further configured so as to include a coolant channel or gallery 242 that is fluidly coupled to a coolant inlet line 240a and to a coolant outlet line 240b. The coolant channel or gallery 242 is in thermal contact with the stator 221 so that thermal energy being generated is communicate to the coolant. The coolant channel or gallery 242 also is preferably electrically isolated from the wire windings 225. Coolant flows into the coolant inlet line 240a into the gallery 242 and thence out through the outlet line.

In further embodiments, the coolant passes through a heat exchange to dissipate heat energy acquired by the coolant before passing back through the gallery 242. In yet further embodiments, a pump is provided to control flow at a desired rate through the gallery 242. It also is within the scope of the present invention to provide a filter so as to filter out any contaminates in the flowing coolant. In yet more particular embodiments, the coolant is oil and in more specific embodiments, the coolant is the engine oil.

Although a preferred embodiment of the invention has been described using specific terms, such description is for illustrative purposes only, and it is to be understood that changes and variations may be made without departing from the spirit or scope of the following claims.

Incorporation By Reference

All patents, published patent applications and other references disclosed herein are hereby expressly incorporated by reference in their entireties by reference.

Equivalents

Those skilled in the art will recognize, or be able to ascertain using no more than routine experimentation, many equivalents of the specific embodiments of the invention described herein. Such equivalents are intended to be encompassed by the following claims.

What is claimed is:

1. A starter/generator for a reciprocating engine, comprising:
   a plurality of permanent magnetic elements that establish a magnetic flux field, each of the plurality of permanent magnetic elements being attached to a surface of a crankshaft for a reciprocating engine so as to rotate in a prescribed path responsive to rotation of the crankshaft;
   a plurality of stator elements being arranged and configured within the reciprocating engine so as to be maintained in fixed relation to a corresponding permanent magnetic element as the magnetic element rotates in the prescribed path past a surface of the corresponding stator element; and
   control circuitry that is configured and arranged to control the functionality of each stator element, such that in one mode a corresponding stator element is controlled so that movement of the corresponding permanent magnetic element by the corresponding stator element cause electrical energy to be generated in the respective stator element and such that in another mode the each stator element permanent magnetic element combination operates said motor/generator as a motor, wherein the plurality of permanent magnetic elements, the plurality of stator elements, and the control circuitry of the starter/generator are integrated in the reciprocating engine.

2. The starter/generator of claim 1, wherein each stator element includes a plurality of iron cores and a plurality of wire coils, each coil being wrapped around a respective iron core, and wherein the controlling circuitry is operably coupled to each wire coil.

3. The starter/generator of claim 2, wherein each stator element includes a cooling mechanism for drawing heat energy from the stator element.

4. The starter/generator of claim 3, wherein the cooling mechanism is a channel thermally coupled to each iron core and a cooling medium that flows through the channel.

5. The starter/generator of claim 1, wherein the surface of the crankshaft is a surface of a counterweight of the crankshaft.

6. A reciprocating engine, comprising
a crankshaft having structure that rotates in a prescribed path about a centerline of the crankshaft; and
a starter/generator that is operably coupled to the crankshaft such that in one operational mode the starter/generator cause the crankshaft to rotate and in a second operational mode the rotation of the crankshaft causes the starter generator to output electrical energy, wherein said starter generator includes:
a plurality of permanent magnetic elements that establish a magnetic flux field, each of the plurality of permanent magnetic elements being attached to a surface of the crankshaft structure so as to rotate in the prescribed path responsive to rotation of the crankshaft;
a plurality of stator elements being arranged and configured within the reciprocating engine so as to be maintained in fixed relation to a corresponding permanent magnetic element as the permanent magnetic element rotates in the prescribed path past a surface of the corresponding stator element; and
control circuitry that is configured and arranged to control the functionality of each stator element, such that in said one operational mode each stator element permanent magnetic element combination operates so said motor/generator operates as the motor to rotate the crankshaft and so that in the second operational mode a corresponding stator element is controlled so that movement of the corresponding permanent magnetic element by the corresponding stator element cause electrical energy to be generated in the respective stator element, wherein the plurality of permanent magnetic elements, the plurality of stator elements, and the control circuitry of the starter/generator are integrated in the reciprocating engine.

7. The reciprocating engine of claim 6, wherein each stator element includes a plurality of iron cores and a plurality of wire coils, each coil being wrapped around a respective iron core, and wherein the controlling circuitry is operably coupled to each wire coil.

8. The reciprocating engine of claim 7, wherein each stator element includes a cooling mechanism for drawing heat energy from the stator element.

9. The reciprocating engine of claim 8, wherein the cooling mechanism is a channel thermally coupled to each iron core and a cooling medium that flows through the channel.

* * * * *